United States Patent [19]

Wingate et al.

[11] 4,055,070
[45] Oct. 25, 1977

[54] GAGE STOP ASSEMBLY

[75] Inventors: Sidney A. Wingate, Concord, Mass.; Edward L. Dreano, Jr., Derry, N.H.

[73] Assignee: Dynamics Research Corporation, Wilmington, Mass.

[21] Appl. No.: 718,815

[22] Filed: Aug. 30, 1976

[51] Int. Cl.² .................................................. B21D 11/22
[52] U.S. Cl. .................................................. 72/461
[58] Field of Search .................. 72/461, 36, 34, 389, 72/32

[56] References Cited
U.S. PATENT DOCUMENTS

| | | | |
|---|---|---|---|
| 784,726 | 3/1905 | Yates | 72/461 |
| 2,924,260 | 2/1960 | Guarino | 72/36 |
| 3,260,087 | 7/1966 | Guarino | 72/36 |
| 3,421,359 | 1/1969 | Gibbs | 72/461 |
| 3,704,611 | 12/1972 | Hirsch | 72/36 |
| 3,812,695 | 5/1974 | Roch | 72/461 |
| 3,826,119 | 7/1974 | Marotto | 72/461 |

*Primary Examiner*—C.W. Lanham
*Assistant Examiner*—Gene P. Crosby
*Attorney, Agent, or Firm*—Weingarten, Maxham & Schurgin

[57] ABSTRACT

A gaging stop is disclosed for use with a press brake which employs a direct drive servo motor directly coupled to a movable table and linear encoder directly coupled to the movable table for providing electrical output signals representative of actual gage position. One or more gage stop assemblies are supported by the movable table and are manually adjustable to both coarse and fine degrees. Closed loop servo control of gage position is provided to control motor drive in response to actual position signals derived from the linear encoder.

14 Claims, 7 Drawing Figures

GAGE STOP ASSEMBLY

FIELD OF THE INVENTION

This invention relates to gaging systems and more particularly to a system for use with a press brake.

BACKGROUND OF THE INVENTION

Gaging systems for press brakes and other sheet forming and cutting apparatus are well known and generally comprise a gage bar or other element adjustably positioned as a reference against which a sheet is butted for appropriate location prior to bending, cutting or other formation. In a press brake for forming bends in sheet metal, the gaging system, known in the art as a back gage, is disposed behind the press to serve as an adjustable stop against which sheet stock introduced from the front of the press between the forming dies is butted to position the sheet for an intended bend. It is desirable to be able to easily and accurately adjust the gage position and especially in an automatically controlled system, to accurately reposition the gage in an intended sequence. It is also desirable to know if the gage position has changed or become misadjusted.

The automatic control of press brakes and other forming machinery has become realizable for even relatively small machines by the advent of reliable and economical electronics employing readily programmed microprocessors or microcomputers. It is the object of this invention to provide a gage system especially adapted for use in an automatically controlled system. While the invention will be described in relation to a preferred embodiment for use with a press brake, it is contemplated that the invention is more broadly useful with a variety of sheet forming and cutting machines.

SUMMARY OF THE INVENTION

In brief the present invention provides a gaging system especially adapted for use as a press brake gage which is of simple yet reliable and accurate construction and which can be employed in an automatically controlled system. The system employs a direct drive servo motor directly coupled to a movable table to which is affixed one or more gage stop assemblies. A linear encoder is directly coupled to the movable table for providing electrical output signals representative of actual gage position. The gage assemblies are positionable to both coarse and fine degrees by simple manual adjustment, while a single manual control is provided for vertical adjustment of the gage assemblies. The direct motor drive and linear encoder are coupled to an electronic controller by which intended gage positions can be programmed and gage position read out.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
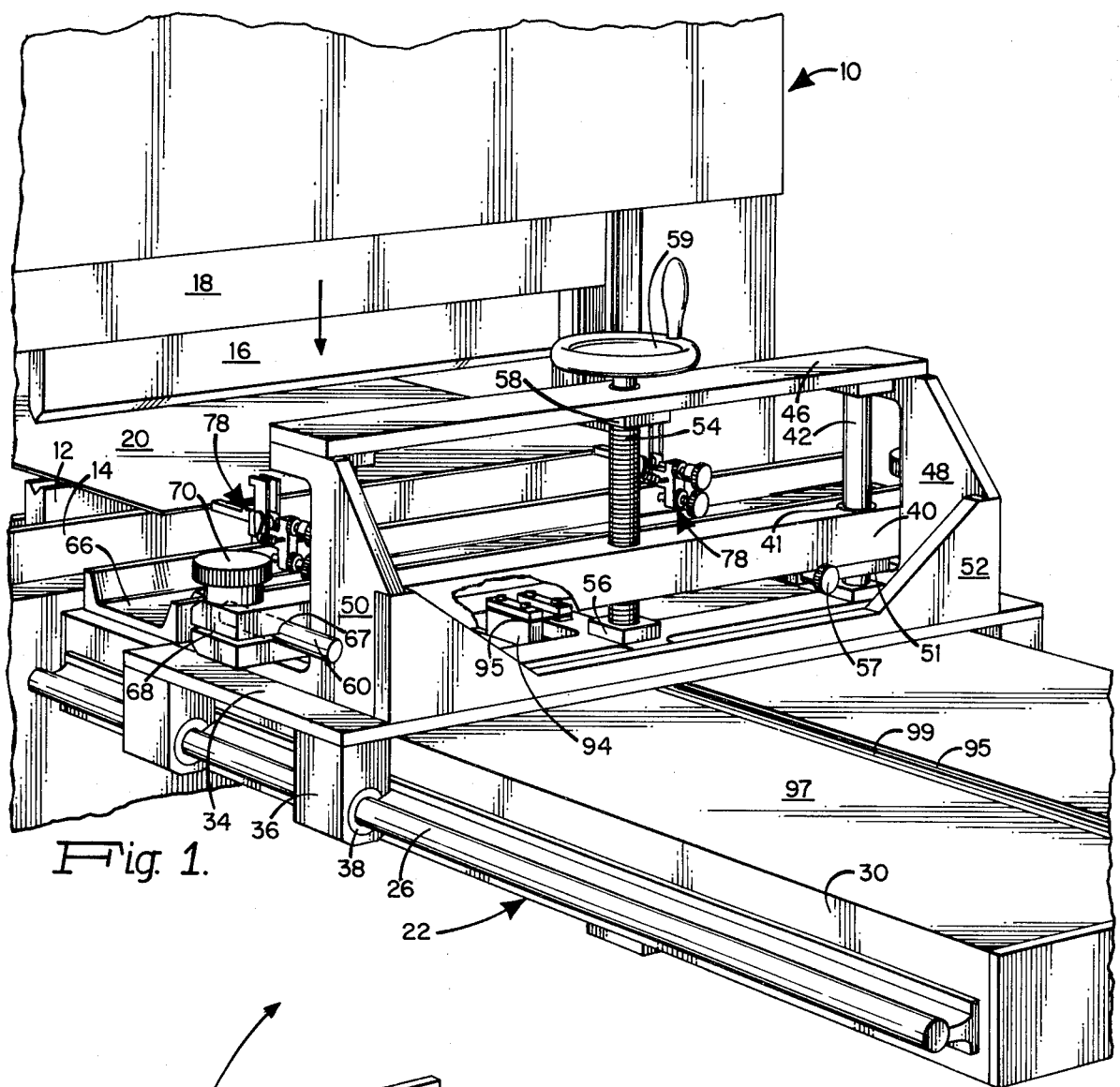
FIG. 1 is a pictorial view of a gaging system according to the invention.

Referring to FIG. 1, there is shown the gaging system according to the invention mounted at the rear of a metal forming machine here illustrated as a hydraulic press brake 10 for bending sheet metal stock. The press includes a fixed die 12 secured to a support member 14, and a movable die 16 affixed to and driven by a ram 18. A sheet 20 of metal is inserted from the front of the press 10 between the dies 12 and 16 to an intended position, the press being operative in well known manner to produce a bend in sheet 20 by coaction of the dies 12 and 16. The position to which sheet 20 is inserted between dies 12 and 16 is determined by the gaging system of the invention and which can be rapidly and automatically controlled to provide different gaging positions in an intended sequence.

Figure 2:
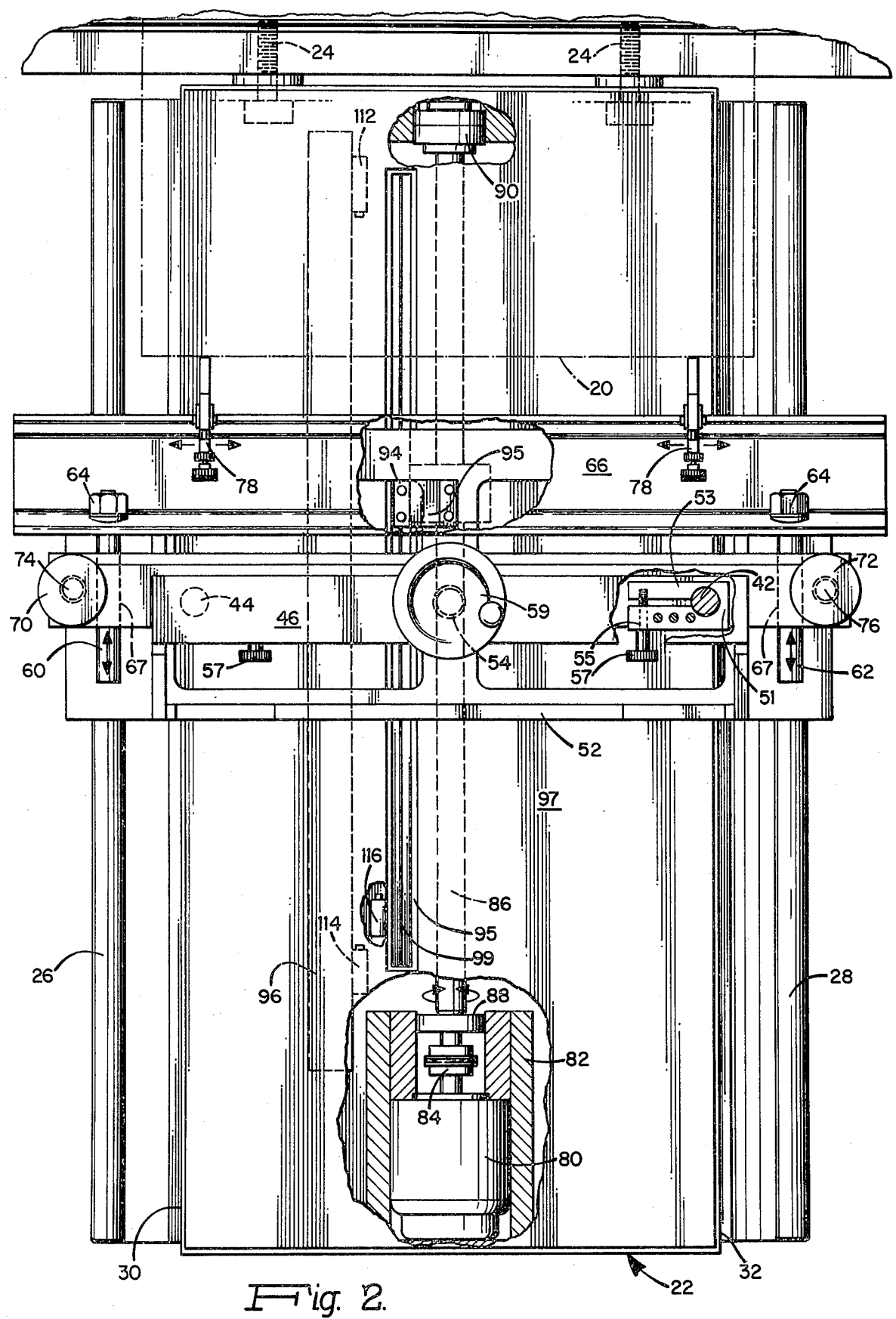
FIG. 2 is a partly cutaway plan view of the embodiment of FIG. 1.

The gaging system as shown in FIGS. 1 and 2 includes a generally rectangular base 22 supported on legs or other supporting structure (not shown) and secured to the press 10 such as by bolts 24. First and second guide rods 26 and 28 are mounted on respective sides 30 and 32 of base 22 and extend substantially along the length thereof from the front to the back of the base. In usual implementation, the base and guide rods are horizontally mounted. A table 34 is supported above base 22 for horizontal movement forward and rearward along the guide rods 26 and 28. The table 34 is supported on the guide rods by downwardly extending corner posts 36 each having a respective ball bushing 38 for accurate, low friction sliding movement on the associated guide rods. An arm 40 is horizontally disposed along the width of the table 34 and is mounted for vertical movement in order to provide vertical adjustment of the gaging stop, as will be described. Vertical guide rods 42 and 44 are secured by a supporting structure, including top plate 46, side plates 48 and 50 and back plate 52, near respective sides of table 34. The arm 40 is mounted by means of suitable bushings 41 on rods 42 and 44 for slidable movement thereon as governed by the rotation of a vertical adjustment screw 54 which is threaded into a cooperative opening through arm 40 and which is supported between a lower bearing 56 on table 34 and an upper bearing 58 on top plate 46. A hand wheel 59 is affixed to screw 54 for manual rotation thereof to provide vertical adjustment of arm 40.

A clamp 51 can be provided around each guide rod 42 and 44 to secure arm 40 in a selected vertical position and prevent wobble of the arm. Each clamp 51 is affixed to the bottom surface of arm 40 and includes an opening through which the associated rod is disposed, and a slotted end 53 which is drawn together by means of a threaded shaft 55 rotated by a knob 57 to thereby clamp arm 40 to rods 42 and 44. The clamp is typically secured to the arm by machine screws along one side of the clamp to leave one side of the slotted end free to move for clamping.

Each end of arm 40 is slotted and drilled for clamping of a channel 66 supported by the arm. Each arm end includes an opening 67 extending horizontally therethrough for accommodation of a respective rod 60 and 62 for slidable movement therein, and a alot 68 extending from opening 67 to the arm end. The rods 60 and 62 are fastened such as by threaded ends and associated nuts 64 to the rearward upstanding flange of channel 66 which extends across the width of table 34. Knobs 70 and 72 and respective threaded shafts 74 and 76 are threadably attached to the respective slotted ends of arm 40 and are operative to clamp the respective rods 60 and 62 for course positioning of channel 66. Gage stop assemblies 78 are affixed to the forward flange of channel 66 and can be positioned at desired locations along the length of channel 66. The assemblies 78 are operative to provide precisely adjustable definition of the gaging position as well as providing yieldable movement if struck or interferred with by the sheet being formed and easy interchangeability of gaging stops for different gaging needs. The gage stop assemblies will be further described below.

Figure 3:
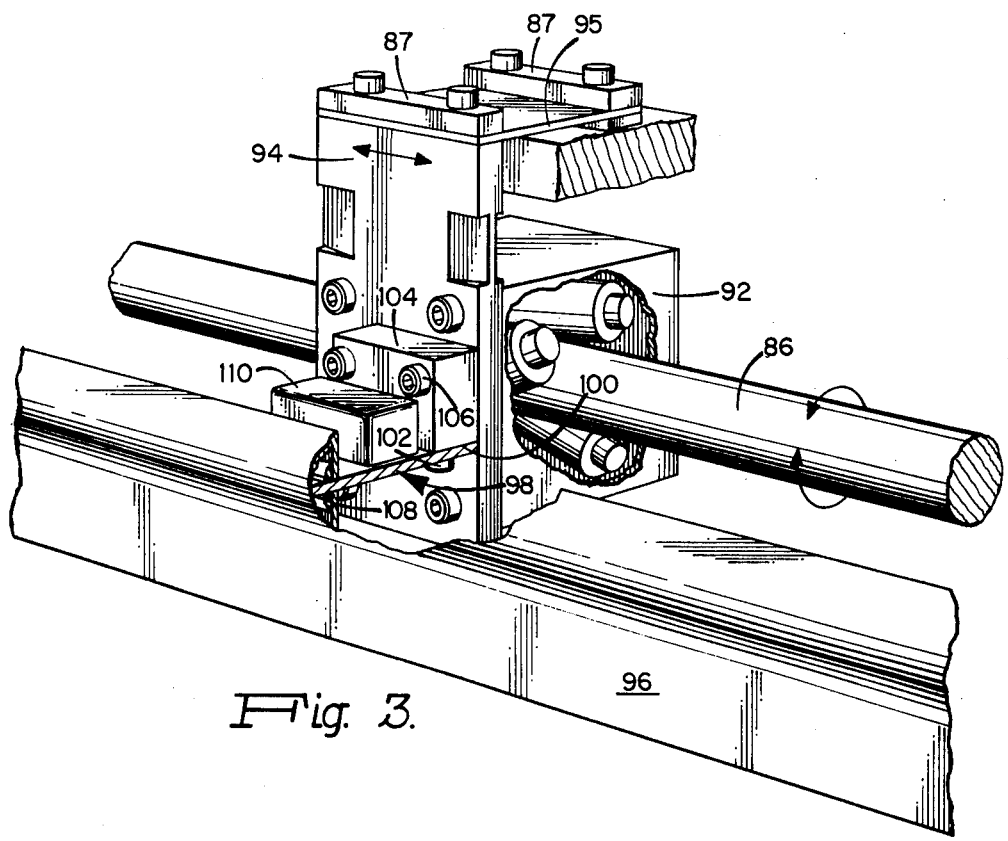
FIG. 3 is a pictorial view partly cutaway and partly in section illustrating the direct coupling of the movable table to the linear actuator and to the linear encoder.
Figure 4:
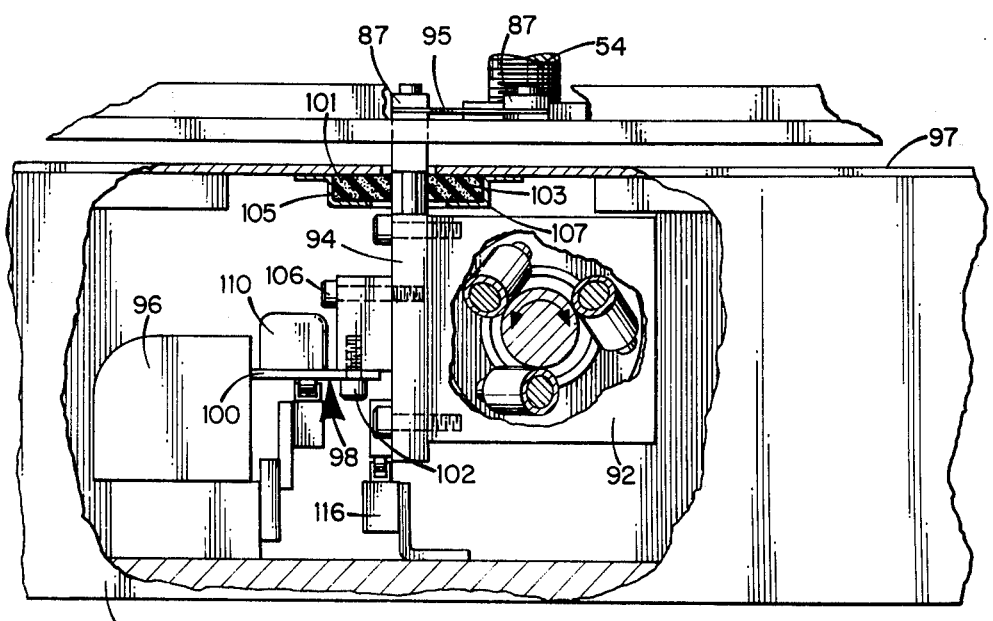
FIG. 4 is a cutaway elevation view of the direct drive and linear encoder coupling.
Figure 5:
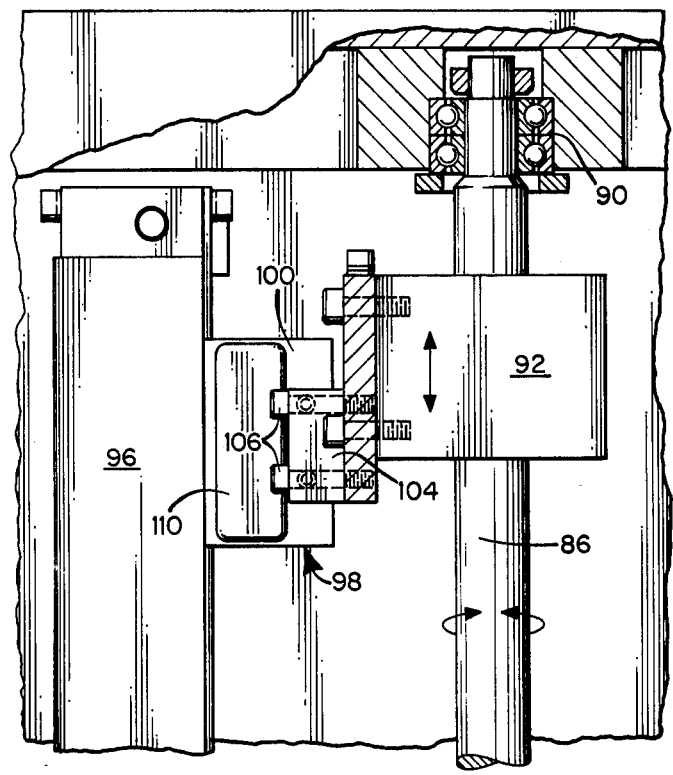
FIG. 5 is a cutaway plan view of the linear encoder and direct drive coupling.

As best illustrated in FIG. 2, the table 34 and channel 66 mounted thereon are movable in a horizontal direction by means of a servo drive motor 80 disposed within base 22 in a support 82. The shaft of motor 80 is coupled via a flex joint 84 to a drive shaft 86 supported for rotation at the respective ends thereby by bearings 88 and 90. The rotational movement of drive shaft 86 is converted into translational movement by a linear actuator such as a Roh-lix coupler 92 through which shaft 86 is rotatably disposed, as seen in FIGS. 3–5. Linear actuator 92 is connected by plates 94 and 85 to table 34 for transport thereof as the actuator is driven by motor 80 and shaft 86. The plate 94 is attached to actuator 92 and extends upwardly to table 34. A resilient plate 84 is affixed at one end to the top of plate 94 and at an opposite end to a portion of table 34, such as by bars 87 and machine screws. The plate 85 is resilient in directions transverse to its plane for accommodation of slight misalignment between the drive shaft 86, table 34 and guide rods 26 and 28 as table 34 is driven forward or rearward along the travel path.

The actuator 92 includes three wheels 93 rotatably disposed within the actuator housing and equally spaced about shaft 86 and in contact therewith. The wheels 93 are skewed with respect to the axis of the drive shaft and are rotatable in response to rotation of the drive shaft to produce a translational force along the drive shaft axis. Thus, rotation of shaft 86 causes linear movement of actuator 92 and table 34 coupled thereto along a forward or rearward direction depending on the direction of rotation of shaft 86. The wheels 93 of actuator 92 are spring loaded into driving contact with shaft 86 and the loading force of the wheels can be adjusted to provide a desired slippage in the event that the table 34 or gage stop assemblies are subjected to an applied force. The system is thereby protected against damaging shocks or forces by slippage of the linear actuator on the drive shaft. Upon such slippage, however, the gage stops can be automatically repositioned since the movement of the stops is directly sensed by the linear encoder 96 which will provide a signal to the servo control for appropriate driving of the servo motor 80 for repositioning of the gage stops.

The plate 94 moves through a slot 95 provided in the cover 97 of base 22 and through a seal 99 provided in the cover slot for sealing of the interior of base 22 from dirt and other contamination. In the embodiment illustrated, as seen in FIG. 4, the seal 99 is composed of two confronting resilient strips 101 and 103 held by respective brackets 105 and 107 secured to the bottom side of cover 97. The resilient strips are normally in contact with one another and are yieldable in response to the passage of plate 94 to permit movement of the plate during transport of table 34 to different gaging positions. The leading and trailing edges of plate 94 which pass through seal 99 are tapered as illustrated to facilitate slidable movement through the seal.

A linear encoder 96 is mounted within base 22 and is disposed adjacent to and along the length of drive shaft 86. The encoder is connected to plate 94 of the movable table 34 by a coupler 98 which includes a plate 100, as best seen in FIGS. 3 through 5. The plate 100 is fastened such as by machine screws 102 to a mounting block 104 which, in turn, is fastened to plate 94 such as by machine screws 106. The linear encoder 96 is itself of known construction and operation, a preferred implementation being shown in U.S. Pat. No. 3,816,003 of the present assignee and also available commercially under the trade designation LMT 025 of the assignee, Dynamics Research Corporation. In general, the encoder includes an elongated scale having an array of anternatively light transmissive and opaque segments. A movable assembly coupled to plate 100 includes a reticle cooperative with the optical pattern on the scale and a light source for illumination of the optical pattern and photosensors for providing an electrical output in response to the sensed optical pattern and representative of the position of the movable assembly with respect to the stationary scale.

The plate 100 extends through a seal 108 of encoder 96 and through which plate 100 is movable such that the encoder interior remains sealed from dirt and other contaminants. A junction box 110 is secured to plate 100 in which electrical connections are made between the encoder electrical output leads and the control apparatus for motor 80. The table 34 is directly coupled by means of plates 94 and 100 to linear encoder 96 and the encoder output signals, therefore, provide a direct indication of the actual position of the table along its travel path. The table and thus the gaging assemblies 78 can be accurately driven to selected gaging positions, which positions can be automatically and precisely maintained.

As seen in FIG. 2, first and second limit switches 112 and 114 are disposed on encoder 96 at the respective ends of the travel path. The switches are actuated by plate 100 to provide a switch indication of an end of travel condition. Another switch 116, shown in FIG. 4, is disposed along the travel path near the limit switch 144 and is actuable by plate 94 to provide an indication of a calibrate position. Alternatively, the calibrate position can be defined by a zero reference indication produced by encoder 96.

Figure 6:
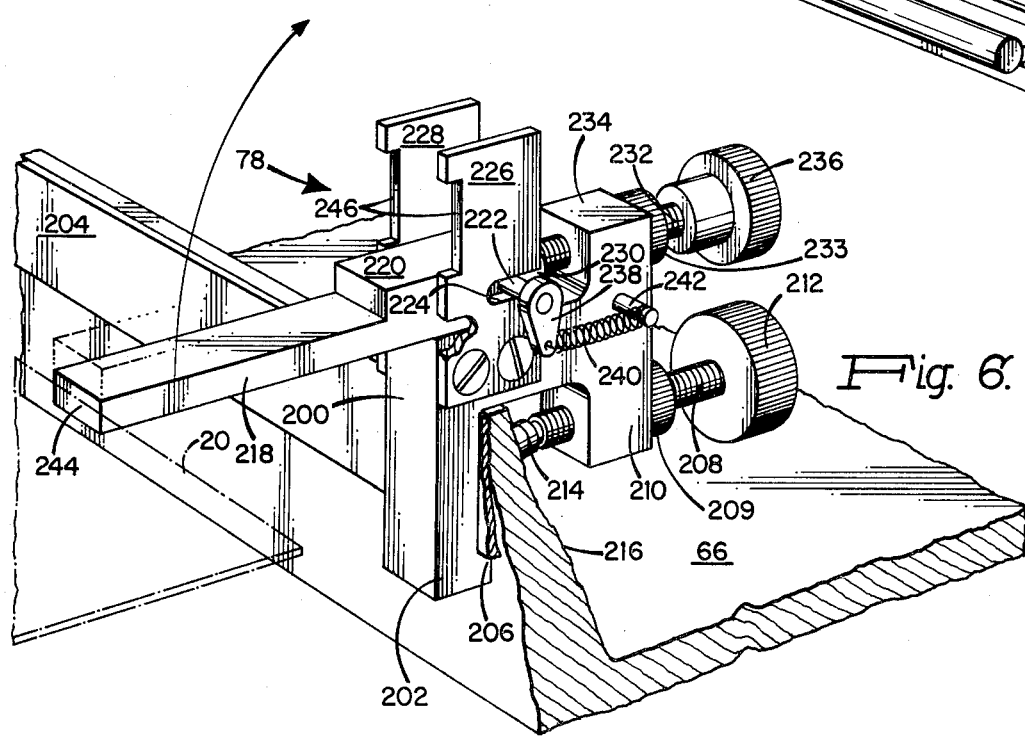
FIG. 6 is a pictorial view of a gage stop assembly according to the invention.

The gage stop assembly 78 is shown more particularly in FIG. 6 affixed to channel 66 and includes a body 200 having a downwardly extending arm 202 which engages a hardened and ground steel strip 204 affixed to the forward face of channel 66 as an accurate and wear resistant surface. The clamp arm 202 includes a flange portion 206 which is disposed beneath the lower edge of strip 204 for positive retention of the gage stop assembly on channel 66. A locking screw 208 is threaded through a rearwardly disposed arm portion 210 and is manually rotatable by a knob 212. The locking screw includes a universally pivoted end 214 for accommodation to and engagement with the inclined inner surface 216 of channel 66. A lock nut 209 can be threaded onto screw 208 for loading against armp portion 210. A gage stop 218 includes a rearward mounting portion 220 having an axle 222 disposed therethrough. The outwardly extending ends of axle 222 are disposed therethrough. The outwardly extending ends of axle 222 are disposed within respective slots 224 provided in respective guide plates 226 and 228 which are affixed to and upstanding from clamp 200.

The rearward end 230 of gage stop 218 is cylindrical about axle 222 and engages the end of an adjusting screw 232 threaded through upwardly extending arm portion 234 of the body. A knob 236 is attached to adjusting screw 232 for manual rotation thereof, and a lock nut 233 can be threaded onto screw 232 to lock this screw in a selected position. First and second cranks 238 are secured to respective ends of axle 222 with a spring 240 being connected between the ends of respective crank 238 and a respective retaining pin 242 affixed to the body. The forward end 244 of gage 218 provides a gaging face, the position of which is adjustable by rotation of knob 236 of the adjusting screw 232. Gage stop 218 is maintained in a normally horizontal orientation by the confronting upper surface of arm 202, and in butting relationship with the end of adjusting screw 232 by the urging of springs 240. The gage position can be precisely adjusted by rotation of knob 236 to cause movement of the gage stop either forward and rearward to a desired position. Course adjustment of the gage position is provided by movement of channel 66 and rods 60 and 62 with respect to arm 40.

The gage stop 218 of each assembly 78 is readily removable for replacement with stops of different intended configurations to suit specific gaging requirements. Such removal is accomplished by withdrawal of adjusting screw 232 sufficiently to provide clearance of slots 224 by the axle 222. The springs 240 are removed from the cranks 238 or pins 242 to permit removal of the gage stop from the body. To install a gage stop, the axle 22 is inserted within the guide slots 224 and the springs 240 connected between the retaining pins 242 and cranks 238. The adjusting screw 232 is then rotated to provide intended positioning of the gage face 244. The gage stop is urged by the springs 240 into contact with the confronting end of adjusting screw 232 to provide an accurate gaging distance between the screw end and the front gaging face 244 of the stop.

The gage stop is upwardly rotatable, as illustrated by the curved arrow of FIG. 6, in the presence of an upward force such as provided by a reverse bend being formed on a sheet or other intended or accidental movement in which the sheet engages the bottom of the gage stop. Upon removal of the interfering sheet, the gage stop is returned to its normal position by action of springs 240 and associated cranks 238. A slot 246 is provided in each guide plate 226 in the forward edges thereof facing sheet material to be formed. The upstanding portions of plates 226 and 228 and the slot 246 serve as an emergency stop should the sheet being worked upon slip past the gaging face 244 of the stop 218.

Figure 7:
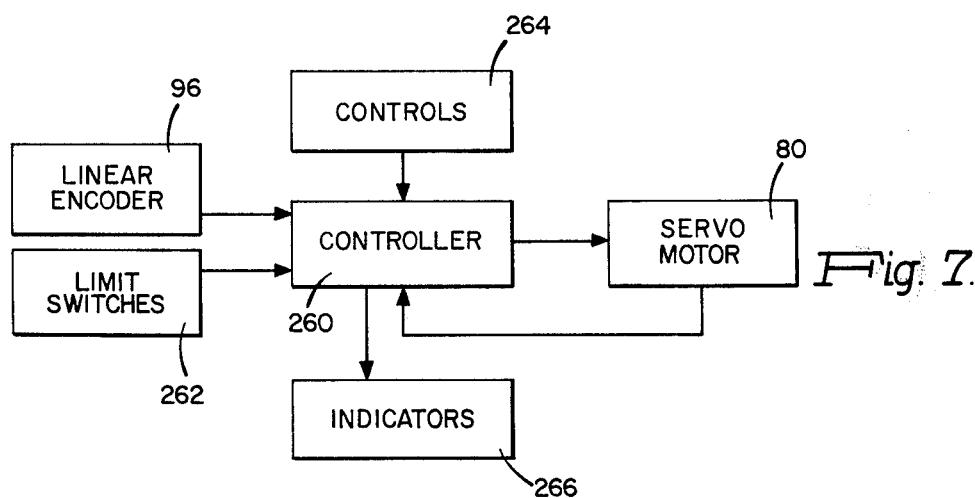
FIG. 7 is a block diagram of an automatic control system in which the invention is employed.

The automatic control system for governing the position of the gage is shown in FIG. 7. The linear encoder 96 provides output signals to a controller 260 which provides drive signals to the servo motor 80 which provides a feedback signal to controller 260. Limit switches 262, which include the switches 112, 114 and 116 described above, are connected to controller 260 to provide signals representative of the forward and rearward ends of the travel path of table 34 and of the calibrate position. Controls 264 are also coupled to controller 260 and by which operating modes and data are entered into controller 260. The controller also provides output signals to indicators 266 to denote system status and other operational displays.

The actual position of table 34 and thus of gage stops 218 is at all times known by virtue of the direct coupling of the movable apparatus to linear encoder 96. A closed loop servo drive is thereby provided for table 34 and associated gage assemblies such that gage position can be automatically and accurately maintained and different gaging positions readily programmed. The electronic control itself forms no part of the present invention; in general, however, controller 260 includes a microprocessor and electronic memory for recording operational data and intended sequences of gaging system operation. The controller 260 can be readily programmed by means of keyboard and other controls on control panel 264 to provide an intended programmed sequence of gage positions. In order to initially calibrate the gaging system the table 34 is driven to the calibrate position as determined by actuation of calibrate switch 116. The gage position is then manually adjusted by means of the coarse and fine manual adjustments to define a reference position, the gaging dimensions entered and stored in controller 260 being with respect to the reference position.

The invention is not to be limited by what has been particularly shown and described except as indicated by the appended claims.

What is claimed is:

1. A gage stop assembly comprising:
a body having a clamping portion by which the assembly is adjustably affixed to a mounting member;
first and second guide plates upwardly extending from the body, each having a slot therein extending along an axis of adjustment and being open rearwardly of said guide plates;
an elongated gage stop having a gaging face at the forward end thereof and an arcuate face at the rearward end thereof and an axle at the rearward portion;
said gage stop being disposed with the axle pivotally and slidably mounted within said slots;
an adjusting screw threadably attached to the body and having an end engageable with the arcuate surface of the gage stop;
spring means coupling the gage stop to the body and urging the arcuate surface of the gage stop into engagement with the adjusting screw;
said adjusting screw being manually rotatable to cause movement of the gage stop along the adjustment axis to thereby adjust the position of the gaging face;
the gage stop being pivotally movable upward from its normal position in response to an upward force applied thereto and being returnable by the spring means to its normal position.

2. The gage stop assembly of claim 1 wherein said body includes a surface maintaining said gage stop in a normal position.

3. The gage stop assembly of claim 2 wherein said spring means includes a crank affixed to said axle and a spring connected between the crank and the body.

4. The gage stop assembly of claim 1 wherein said guide plates each include a slot in the forwardly facing edge and operative to provide an emergency stop if an element being gaged slips past the gaging face of the gage stop.

5. The gage stop assembly of claim 1 wherein said body includes a first downwardly extending arm for engaging a first surface of a mounting member, and a second downwardly extending arm spaced from the first arm; and a locking screw threaded through said second arm and being manually rotatable to cause movement of an end thereof into engagement with a second surface of the mounting member to clamp the body to the mounting member.

6. The gage stop assembly of claim 5 wherein said locking screw includes a universally pivoted end for accommodation to and engagement with a confronting surface of the mounting member.

7. For use in a gaging system employed with a sheet forming machine and having a support movable along a travel path, a gage stop assembly mounted on the support and providing a gaging surface against which a sheet can be positioned, said assembly comprising:

a body having a clamping portion by which the assembly is adjustably affixed to the support;

an elongated gage stop having a gaging face at the forward end thereof and a cylindrical face at the rearward end thereof and pivot means near the rearward end;

means on said body and cooperative with said pivot means for removably supporting the gage stop pivotally and slidably thereon;

an adjusting screw threadably mounted on the body and having an end engageable with the cylindrical surface of the gage stop, and being manually rotatable to cause movement of the gage stop along the axis of the travel path for adjustment of the position of the gaging face; and spring means coupling the gage stop to the body and operative to urge the cylindrical surface of the gage stop into engagement with the adjusting screw and to maintain the gage stop in a normal position.

8. The gage stop assembly of claim 7 wherein said supporting means includes:

guide means upstanding from the body and having slots disposed therein along the axis of the travel path and cooperative with the pivot means of the gage stop.

9. The gage stop assembly of claim 8 wherein said gage stop pivot means incldes an axle slidably and pivotally diposed within the slots of the guide means;

and wherein the body includes a portion for maintaining the gage stop in a normally horizontal position.

10. The gage stop assembly of claim 9 wherein the spring means includes at least one crank affixed to the axle and a spring connected between the crank and the body.

11. A gage stop assembly comprising:

a body having manually operable clamping means for securing the assembly to a support member;

a gage stop pivotally mounted on the body and normally disposed in a horizontal position;

said gage stop including:

an elongated element having a gage face on the forward end thereof and a curved face on the rearward end thereof for butting engagement with the lead screw, and having an axle pivotally mounting said element on the body;

spring means for maintaining said stop in a normally horizontal position, and including a crank on said axle and a spring connected between the crank and the body and operative to urge the element into a normally horizontal position; and manual adjusting means on said body including a lead screw having an end in butting engagement with the stop to provide, upon manual rotation of the lead screw, fine adjustment of the gage position of the stop.

12. The gage stop assembly of claim 11 wherein said body includes first and second spaced guide plates between which said element is pivotally disposed and each having a slot for receiving said axle for pivotal disposition therein and within which slots the axle and element are adjustable by means of the lead screw.

13. A gage stop assembly comprising:

a body having manually operable clamping means for securing the assembly to a support member;

a gage stop having a gaging face at the forward end thereof and an arcuate face at the rearward end thereof and pivot means near the rearward end;

means on said body and cooperative with said pivot means for removably supporting the gage stop pivotally and slidably thereon;

manual adjusting means on said body including a lead screw having an end engageable with the arcuate surface of the gage stop, and being manually rotatable to cause movement of the gage stop along the adjustment axis to thereby adjust the position of the gaging face; and spring means operative to urge the arcuate surface of the gage stop into engagement with the lead screw of said manual adjusting means and to maintain the gage stop in a normal position.

14. The gage stop assembly of claim 13 wherein said body includes:

a first downwardly extending arm for engaging a first surface of a mounting member and a second downwardly extending arm spaced from the first arm, and a locking screw threaded through said second arm and being manually rotatable to cause movement of an end thereof into engagement with a second surface of the mounting member to clamp the body to the mounting member.

* * * * *